US012578704B2

(12) United States Patent
Baker et al.

(10) Patent No.: US 12,578,704 B2
(45) Date of Patent: Mar. 17, 2026

(54) SYSTEMS AND METHODS FOR PREDICTING MATERIAL PROPERTIES OF A PART TO BE ADDITIVE-MANUFACTURED

(71) Applicant: The Boeing Company, Chicago, IL (US)

(72) Inventors: Andrew H. Baker, St. Louis, MO (US); Luke A. Berglind, Brentwood, MO (US); Lawrence E. Pado, St. Charles, MO (US); Justin L'Hote, St. Peters, MO (US); Elaine MacDonald, Wildwood, MO (US); Baily J. Thomas, Lake St. Louis, MO (US)

(73) Assignee: The Boeing Company, Arlington, VA (US)

( * ) Notice: Subject to any disclaimer, the term of this patent is extended or adjusted under 35 U.S.C. 154(b) by 475 days.

(21) Appl. No.: 18/063,773

(22) Filed: Dec. 9, 2022

(65) Prior Publication Data

US 2024/0192659 A1     Jun. 13, 2024

(51) Int. Cl.
*G05B 19/4099*     (2006.01)

(52) U.S. Cl.
CPC ............... *G05B 19/4099* (2013.01); *G05B 2219/49023* (2013.01)

(58) Field of Classification Search
CPC ...... G05B 19/4099; G05B 2219/49023; G06F 2111/10; G06F 2113/10; G06F 2119/08;
(Continued)

(56) References Cited

U.S. PATENT DOCUMENTS 10,201,940 B2     2/2019   Hayes et al.
10,354,139 B1 *   7/2019   Li ........................... G06V 10/82
(Continued)

FOREIGN PATENT DOCUMENTS

EP          3 581 380         8/2021
EP          3 928 899        12/2021
WO      WO 2020/154587       7/2020

OTHER PUBLICATIONS

Sinha, S. and Meisel, N.A., 2020. Predicting material properties for embedded structures created with polymer material extrusion additive manufacturing. Additive Manufacturing, 34, p. 101247. (Year: 2020).*

(Continued)

*Primary Examiner* — Alicia M. Choi
(74) *Attorney, Agent, or Firm* — Walters & Wasylyna LLC

(57)     ABSTRACT

A method is provided for predicting material properties of a part to be additive-manufactured. The method includes additive-manufacturing a plurality of standard parts, and obtaining thermal profiles at select predetermined locations of physical samples of the plurality of standard parts during additive-manufacturing of the plurality of standard parts. The method also includes storing the thermal profiles and corresponding material properties of the physical samples of the plurality of standard parts in a database. The method further includes running a machine-learning algorithm to predict material properties of the part to be additive-manufactured based upon the thermal profiles and corresponding material properties of the physical samples of the plurality of standard parts stored in the database.

30 Claims, 14 Drawing Sheets

(58) Field of Classification Search
CPC ....... G06F 30/27; G06F 30/23; B29C 64/393;
B29C 64/386; B29C 64/165
See application file for complete search history.

(56) References Cited

U.S. PATENT DOCUMENTS

| | | | |
|---|---|---|---|
| 11,054,352 B2 | 7/2021 | Meier et al. | |
| 11,260,475 B2 * | 3/2022 | Morton | B22F 10/34 |
| 2009/0310848 A1 * | 12/2009 | Dang | G06F 30/23 |
| | | | 382/145 |
| 2019/0337232 A1 * | 11/2019 | Prabha Narra | G06F 30/23 |
| 2020/0368815 A1 | 11/2020 | Baker et al. | |
| 2020/0393813 A1 * | 12/2020 | Gupta | B33Y 50/02 |
| 2023/0092277 A1 * | 3/2023 | Wachter | G06F 30/23 |
| | | | 703/6 |
| 2024/0077849 A1 * | 3/2024 | McCallum | B23K 26/342 |
| 2024/0092017 A1 * | 3/2024 | Storck | B22F 10/00 |
| 2024/0136026 A1 * | 4/2024 | Takemoto | G16C 20/30 |
| 2024/0185523 A1 * | 6/2024 | Zhang | G06F 30/27 |
| 2024/0192659 A1 * | 6/2024 | Baker | G06F 30/27 |
| 2025/0021721 A1 * | 1/2025 | Huang | B22F 10/80 |
| 2025/0036825 A1 * | 1/2025 | Kothari | B29C 64/357 |

OTHER PUBLICATIONS

Munk et al: "Geometry Effect on Microstructure and Mechanical Properties in Laser Powder Bed Fusion of Ti-6Al-4V," *Metals*, vol. 12, No. 482 (2022).
European Patent Office, Extended European Search Report, App. No. 23206270.3 (Apr. 23, 2024).

* cited by examiner

104

200

210

_310_

| Temperature (F) | Zone No. (TZ) | Time in Zone (T) |
|---|---|---|
| | TZ1 = Zone 1 | T1 = 50 seconds |
| 1832°F | TZ2 = Zone 2 | T2 = 150 seconds |
| 1652°F | TZ3 = Zone 3 | T3 = 170 seconds |
| 1472°F | TZ4 = Zone 4 | T4 = 130 seconds |
| 1292°F | TZ5 = Zone 5 | T5 = 50 seconds |

*400*

*420*

| Input Number | Modeling Inputs | Input Type | Description |
|---|---|---|---|
| 1 | TZ1Ln | Main Effect | Natural Log of Time in Zone 1 |
| 2 | TZ2Ln | Main Effect | Natural Log of Time in Zone 2 |
| 3 | TZ3Ln | Main Effect | Natural Log of Time in Zone 3 |
| 4 | TZ4Ln | Main Effect | Natural Log of Time in Zone 4 |
| 5 | TZ5 | Main Effect | Time in Zone 5 |
| 6 | SlopeTZ12Ln | Main Effect | Natural Log of ARCTAN(TZ12 Slope) |
| 7 | SlopeTZ23Ln | Main Effect | Natural Log of ARCTAN(TZ23 Slope) |
| 8 | SlopeTZ34Ln | Main Effect | Natural Log of ARCTAN(TZ34 Slope) |
| 9 | TZ1Ln*TZ1Ln | Quadratic Effect | |
| 10 | TZ1Ln*TZ2Ln | Interaction Effect | |
| 11 | TZ2Ln*TZ2Ln | Quadratic Effect | |
| 12 | TZ1Ln*TZ3Ln | Interaction Effect | |
| 13 | TZ2Ln *TZ3Ln | Interaction Effect | |
| 14 | TZ3Ln*TZ3Ln | Quadratic Effect | |
| 15 | TZ1Ln*TZ4Ln | Interaction Effect | |
| 16 | TZ2Ln*TZ4Ln | Interaction Effect | |
| 17 | TZ3 Ln *TZ4Ln | Interaction Effect | |
| 18 | TZ4Ln*TZ4Ln | Quadratic Effect | |
| 19 | TZ1Ln *TZ5 | Interaction Effect | |
| 20 | TZ2Ln *TZ5 | Interact ion Effect | |
| 21 | TZ3Ln *TZ5 | Interaction Effect | |
| 22 | TZ4Ln *TZ5 | In teraction Effect | |
| 23 | TZ5*TZ5 | Quadratic Effect | |
| 24 | TZ1Ln*SlopeTZ12Ln | Interaction Effect | |
| 25 | TZ2Ln*SlopeTZ12Ln | Interaction Effect | |
| 26 | TZ3Ln*SlopeTZ12Ln | Interaction Effect | |
| 27 | TZ4Ln*SlopeTZ12Ln | Interaction Effect | |
| 28 | TZ5*SlopeTZ12Ln | Interaction Effect | |
| 29 | SlopeTZ12Ln*SlopeTZ1.2Ln | Quagratic Effect | |
| 30 | TZ1Ln*SlopeTZ23Ln | Interaction Effect | |
| 31 | TZ2Ln*SlopeTZ23Ln | Interaction Effect | |
| 32 | TZ3Ln *SlopeTZ23Ln | Interaction Effect | |
| 33 | TZ4Ln*SlopeTZ23Ln | Interaction Effect | |
| 34 | TZ5*SlopeTZ23Ln | Interaction Effect | |
| 35 | SlopeTZ12Ln*SlopeTZ23Ln | Interaction Effect | |
| 36 | SlopeTZ23 Ln *SlopeTZ23Ln | Quadratic Effect | |
| 37 | TZ1Ln "*SlopeTZ34Ln | Interaction Effect | |
| 38 | TZ2Ln*SlopeTZ34Ln | Interaction Effect | |
| 39 | TZ3Ln*SlopeTZ34Ln | Interaction Effect | |
| 40 | TZ4Ln*SlopeTZ34Ln | Interaction Effect | |
| 41 | TZ5*SlopeTZ34Ln | Interaction Effect | |
| 42 | SlopeTZ12Ln *SlopeTZ34Ln | Interaction Effect | |
| 43 | SlopeTZ23Ln*SlopeTZ34Ln | Interaction Effect | |
| 44 | SlopeTZ34Ln*SlopeTZ34Ln | Quadratic Effect | |

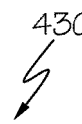

ASSIGN VOXELS FROM MACHINE AXIS COORDINATES

X (VOXEL)

Z (VOXEL)

Y (VOXEL)

X (MACH AXIS)

Z (MACH AXIS)

Y (MACH AXIS)

SYSTEMS AND METHODS FOR PREDICTING MATERIAL PROPERTIES OF A PART TO BE ADDITIVE-MANUFACTURED

FIELD

The present disclosure generally relates to additive manufacturing and, more particularly, to a system and method for predicting material properties of a part to be additive-manufactured, such as an aerospace part.

BACKGROUND

Parts, made using additive manufacturing techniques, are fabricated by adding material layer by layer. Additive manufacturing is a fabrication technique based upon a material feeding and deposition process. During an additive-manufacturing process, thermal characteristics can vary significantly at different locations of the part being fabricated. These variations in thermal characteristics during the additive-manufacturing process can lead to variations in material properties throughout the fabricated part, especially if the part has a complex geometry. Despite advances already made, those skilled in the art continue with research and development efforts in the field of additive manufacturing to fabricate different types of parts.

SUMMARY

In one aspect, a method is provided for predicting material properties of a part to be additive-manufactured. The method comprises additive-manufacturing a plurality of standard parts, and obtaining thermal profiles at select predetermined locations of physical samples of the plurality of standard parts during additive-manufacturing of the plurality of standard parts. The method also comprises storing the thermal profiles and corresponding material properties of the physical samples of the plurality of standard parts in a database. The method further comprises running a machine-learning algorithm to predict material properties of the part to be additive-manufactured based upon the thermal profiles and corresponding material properties of the physical samples of the plurality of standard parts stored in the database.

In another aspect, a system is provided for predicting material properties of a part to be additive-manufactured. The system comprises a first device for collecting thermal data associated with additive-manufactured standard parts. The system also comprises a second device for predicting material properties of the part to be additive-manufactured based upon collected thermal data associated with the additive-manufactured standard parts.

In yet another aspect, a system is provided for predicting material properties of a part to be additive-manufactured. The system comprises one or more infrared cameras for collecting thermal data associated with additive-manufactured standard parts. The collected thermal data associated with each additive-manufactured part comprises a unique thermal signature and history associated with that particular additive-manufactured part. The system also comprises a computer processor for predicting a combination of material properties and microstructural properties associated with the part to be additive-manufactured based upon collected thermal data associated with the additive-manufactured standard parts.

Other examples of the disclosed systems and methods will become apparent from the following detailed description, the accompanying drawings and the appended claims.

BRIEF DESCRIPTION OF THE DRAWINGS

FIG. 4C is a list of all inputs used to train the machine-learning algorithm in FIG. 4B.

DETAILED DESCRIPTION

The present application is directed to a system and method for predicting material properties of a part to be additive-manufactured. The specific construction of the system and method therefor and the industry in which the system and method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes a system and method for predicting material properties of a part to be additive-manufactured, such as an aerospace part. The system and method may be implemented by an original equipment manufacturer (OEM) in compliance with military and space regulations. It is conceivable that the disclosed system and method may be implemented in many other manufacturing industries.

Figure 1:
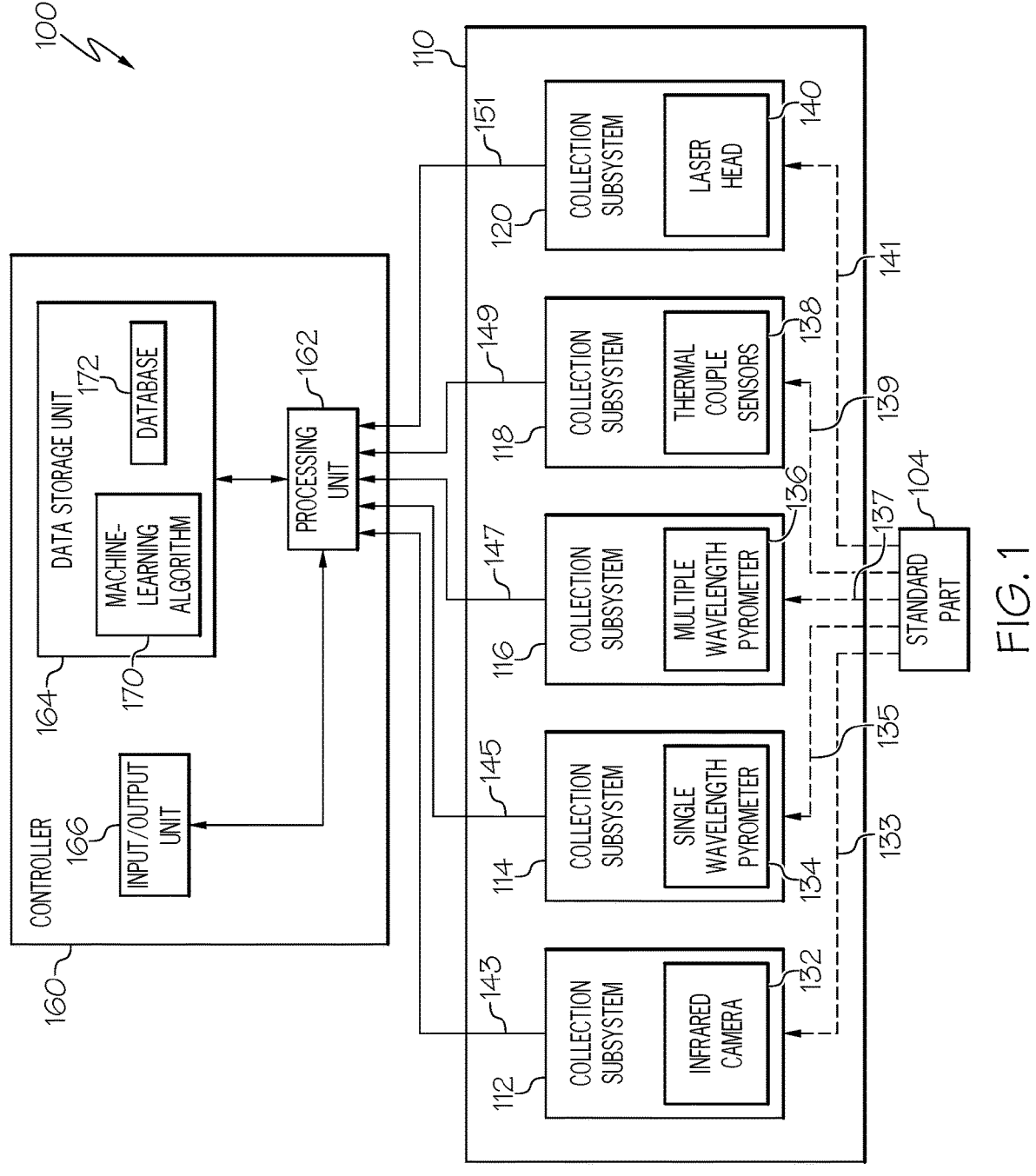
FIG. 1 is a block diagram of a system for predicting material properties of a part to be additive-manufactured, according to an embodiment.

Referring to FIG. 1, a block diagram of a system 100 for predicting material properties of a part to be additive-manufactured, according to an embodiment is illustrated. In FIG. 1, solid lines with arrowheads represent electrical connections, and dashed lines with arrowheads represent transmission of thermal information. The system 100 includes a first device 110 for collecting thermal data associated with additive-manufactured standard parts. The first device 110 comprises a number of different collection subsystems. For example, as shown in FIG. 1, five separate collection subsystems 112, 114, 116, 118, 120 are illustrated.

Collection subsystem 112 comprises an infrared camera 132, collection subsystem 114 comprises a single-wavelength pyrometer 134, and collection subsystem 116 comprises a multiple-wavelength pyrometer 136. Collection subsystem 118 comprises one or more thermocouple sensors 138 that are thermally coupled to a baseplate 102 on which a standard part 104 to be additive-manufactured is disposed. Collection subsystem 120 comprises a laser head 140. The first device 110 may comprise a combination of the infrared camera 132, the single-wavelength pyrometer 134, the multiple-wavelength pyrometer 136, the one or more thermocouple sensors 138, and the laser head 140. Preferably, the first device 110 comprises the infrared camera 132, and optionally a combination of the single-wavelength pyrometer 134, the multiple-wavelength pyrometer 136, the one or more thermocouple sensors 138, and the laser head 140.

Each of the combination of the infrared camera 132, the single-wavelength pyrometer 134, the multiple-wavelength pyrometer 136, the one or more thermocouple sensors 138, and the laser head 140 is positioned relative to the standard part 104 to detect thermal changes at one or more select predetermined locations of the standard part 104 as the standard part 104 is being additive-manufactured. Each of the combination of the infrared camera 132, the single-wavelength pyrometer 134, the multiple-wavelength pyrometer 136, the one or more thermocouple sensors 138, and the laser head 140 provides signals on lines 133, 135, 137, 139, 141, respectively, indicative of corresponding detected thermal changes. Structure and operation of infrared cameras, single-wavelength pyrometers, multiple-wavelength pyrometers, thermocouples, and laser heads are known and conventional and, therefore, will not be described.

The system 100 also includes a second device (e.g., a controller 160) for predicting material properties of a physical part (not shown) that is yet to be additive-manufactured based upon a database of collected thermal data associated with additive-manufactured standard parts including the standard part 104 shown in FIG. 1. More specifically, the second device predicts a combination of material properties and microstructural properties associated with the part to be additive-manufactured. The combination of material properties and microstructural properties associated with the part to be additive-manufactured includes a combination of yield strength, tensile strength, and elongation strength. These material properties are only examples. Other material properties are possible.

The second device may be (or may include) a controller 160 that includes processing unit 162 that executes instructions stored in internal data storage unit 164, external data storage unit (not shown), or a combination thereof. Processing unit 162 may comprise any type of technology. For example, processing unit 162 may comprise a general-purpose electronic processor. Other types of processors and processing unit technologies are possible. Internal data storage unit 164 may comprise any type of technology. For example, internal data storage unit 164 may comprise random access memory (RAM), read only memory (ROM), solid state memory, or any combination thereof. Other types of memories and data storage unit technologies are possible.

Controller 160 further includes a number of input/output (I/O) devices 166 that may comprise any type of technology. For example, I/O devices 166 may comprise a keypad, a keyboard, a touch-sensitive display screen, a liquid crystal display (LCD) screen, a microphone, a speaker, or any combination thereof. Other types of I/O devices and technologies are possible.

In accordance with an aspect of the present disclosure, a machine-learning algorithm 170 and a database 172 storing thermal data collected from many additive-manufactured standard parts (e.g., the standard part 104 shown in FIG. 1) are stored in data storage unit 164. Notably, the processing unit 162 executes instructions contained in the machine-learning algorithm 170 to predict material properties of a physical part yet to be additive-manufactured based upon thermal data that has been collected from many additive-manufactured standard parts and stored in the database 172. The collection of thermal data from many additive-manufactured standard parts, and the training of the machine-learning algorithm 170 are described in detail hereinbelow.

Controller 160 monitors signals on lines 143, 145, 147, 149, 151 from the infrared camera 132, the single-wavelength pyrometer 134, the multiple-wavelength pyrometer 136, the one or more thermocouple sensors 138, and the laser head 140, respectively. The signals on lines 143, 145, 147, 149, 151 represent thermal data associated with the infrared camera 132, the single-wavelength pyrometer 134, the multiple-wavelength pyrometer 136, the one or more thermocouple sensors 138, and the laser head 140, respectively, and are collected and stored in the database 172. The collected thermal data is associated with many additive-manufactured standard parts including the standard part 104 shown in FIG. 1. All collected thermal data for each standard part comprises a unique thermal signature and history associated with that particular additive-manufactured standard part. The database 172 contains all collected thermal data for all standard parts that have been additive-manufactured using the system 100. Accordingly, the database 172 contains a sufficient amount of data for the purpose of training the machine-learning algorithm 170 to enable the processing unit 162 to predict material properties of a physical part yet to be additive-manufactured.

The machine-learning algorithm 170 may comprise a supervised learning model. For example, the machine-learning algorithm 170 may comprise a select one of a generalized linear regression model, a neural network model, a Gaussian process model, and a support vector machine model.

An example method of training the machine-learning algorithm 170 uses as inputs a plurality of features contained in a temperature vs. time curve associated with a specific location of each additive-manufactured standard part. The plurality of features contained in a temperature vs. time curve associated with the specific location of each physical sample of the additive-manufactured standard parts may include a combination of one or more times spent in a plurality of temperature zones and one or more cooling rates between temperature zones, as will be described herein.

Figure 2A:
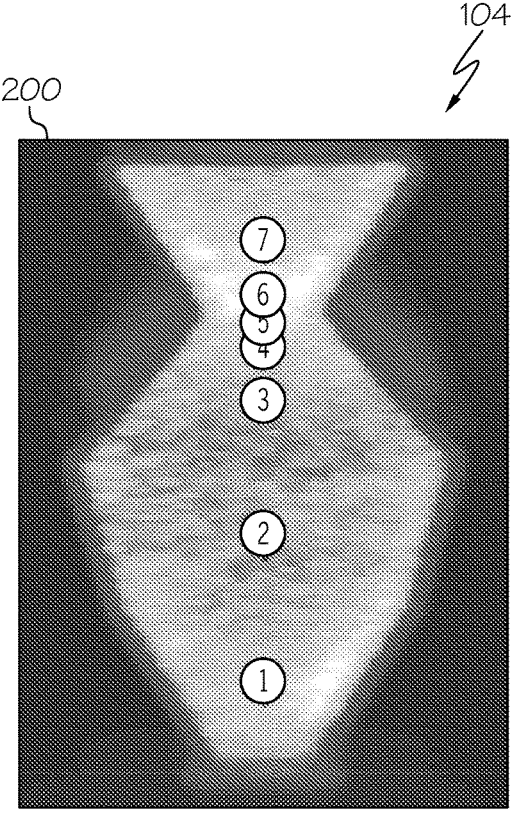
FIG. 2A is a profile view of a standard part and shows a single selected region having a number of different locations of the standard part as the standard part is being additive-manufactured over time.

Referring to FIG. 2A, a profile view is illustrated of a standard part showing a single selected region 200 having a number of different locations of the standard part 104 as the standard part 104 is being additive-manufactured over time. Seven select predetermined locations, designated location 1, location 2, location 3, location 4, location, location 5, location 6, and location 7, are shown in FIG. 2A. As the standard part 104 is being fabricated, material is fed and deposited at location 1, and then builds upward (as viewed looking at FIG. 2A). Material then fed and deposited in similar manner at location 2, location 3, location 4, location 5, location 6, and then location 7. As the standard part 104 is being built upwards, the standard part 104 is fabricated with a desired profile, such as shown in FIG. 2A.

Figure 2B:
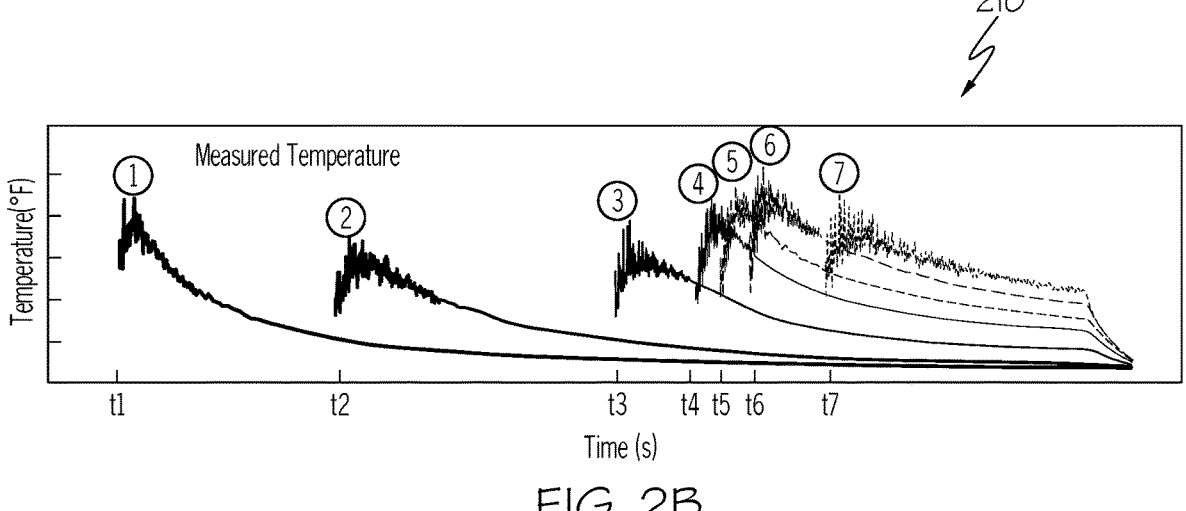
FIG. 2B is a temperature vs. time curve showing measured temperatures at corresponding locations of the standard part that is being additive-manufactured in FIG. 2A.

Referring to FIG. 2B, a temperature vs. time curve 210 is illustrated showing measured temperatures at corresponding locations of the standard part 104 that is being additive-manufactured in FIG. 2A. As shown in FIG. 2B, when material is fed and deposited at location 1 at time t1, the temperature rises for a short period of time before decaying as the feeding and depositing of material moves towards location 2. Similarly, when material is fed and deposited at location 2 at time t2, the temperature rises for a short period of time before decaying as the feeding and depositing of material moves towards location 3. The feeding and depositing of material repeats at locations 3, 4, 5, 6, 7 at times t3, t4, t5, t6, t7, respectively, until the standard part 104 is fabricated with the profile as shown in FIG. 2A. It should be noted that the temperature rise at location 6 is higher than the temperature rises at the other locations since the cross-sectional area of the standard part 104 at that location is narrower than the cross-sectional areas at the other locations.

Figure 3A:
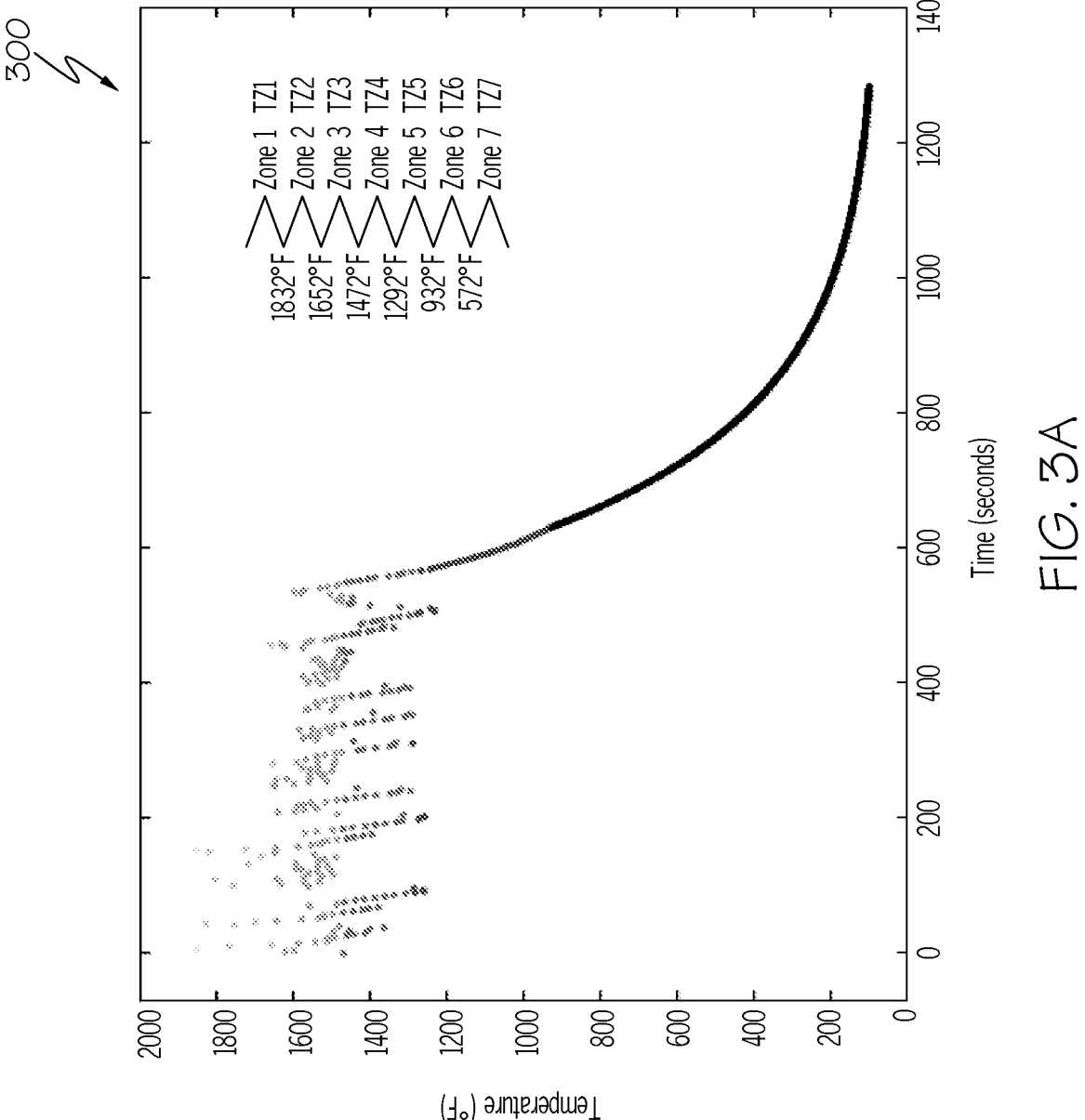
FIG. 3A is a temperature vs. time curve for the single selected region of the standard part that is being additive-manufactured in FIGS. 2A and 2B, and showing sampled temperature data points at each location over time within a number of predefined temperature zones.

Referring to FIG. 3A, a temperature vs. time curve 300 is illustrated for the single selected region 200 of the standard part 104 that is being additive-manufactured in FIGS. 2A and 2B. In particular, FIG. 3A shows sampled temperature data points at each of the locations 1, 2, 3, 4, 5, 6, 7 at the single selected region 200 over time within a number of predefined temperature zones (i.e., temperature bands). Seven predefined temperature zones, designated TZ1, TZ2, TZ3, TZ4, TZ5, TZ6, TZ7, are shown in FIG. 3A. As an example, a temperature data point is captured every two seconds. A temperature data point that is within a particular temperature zone (TZ) when it is captured is deemed to be in that TZ for two seconds. It is understood that only a reduced number of temperature data points are shown in FIG. 3A for purposes of explanation.

Any location in the region 200 of the fabricated standard part 104 shown in FIGS. 2A and 2B can be selected and used as training data for a model process, such as the machine-learning algorithm 170. For purpose of explanation, only the seven locations 1, 2, 3, 4, 5, 6, 7 at the single selected region 200 shown in FIG. 2A will be described in an example way of obtaining model inputs and model outputs to train the machine-learning algorithm 170 shown in FIG. 1.

Model outputs for the machine-learning algorithm 170 are obtained by sectioning the standard part 104 into small lab testable sections of a physical sample (e.g., a tensile specimen). A material property of interest (e.g., tensile strength) of each physical sample is then obtained using suitable lab testing equipment.

Model inputs for the machine-learning algorithm 170 are obtained by using the infrared camera 132 (FIG. 1) to capture pixel-level thermal data, such as shown in FIG. 2A, at each of the select predetermined locations 1, 2, 3, 4, 5, 6, 7 of the standard part 104. The pixel-level thermal data provides a temperature vs. time curve, such as curve 300 shown in FIG. 3A, for each of the locations 1, 2, 3, 4, 5, 6, 7. The captured pixel-level thermal data for each of the locations 1, 2, 3, 4, 5, 6, 7 are collected and stored in the database 172 (FIG. 1) to provide a unique thermal signature and history associated with the particular location of the standard part 104.

Each temperature vs. time curve, such as the curve 300 shown in FIG. 3A, is summarized by calculating eight features of the curve 300. Each of the eight features is then used as model inputs into the machine-learning algorithm 170. An example way of obtaining eight features of the curve 300 shown in FIG. 3A is to define a number of temperature zones, calculate an amount of time the temperature at a specific location of the standard part 104 spent in each temperature zone, and then calculate a number of slopes between temperature zones as the temperature transitions from one zone to an adjacent zone, as will be described hereinbelow.

Figure 3B:
FIG. 3B is a table showing the amount of time the temperature at one location spent in each of the first five different temperature zones shown in FIG. 3A.

Referring to FIG. 3B, a table 310 shows the amount of time the temperature at one location spent in each of the first five different temperature zones TZ1, TZ2, TZ3, TZ4, TZ5 shown in FIG. 3A. As shown in the table 310 of FIG. 3B, the amount of time T1 spent in TZ1 is 50 seconds, the amount of time T2 spent in TZ2 is 150 seconds, the amount of time T3 spent in TZ3 is 170 seconds, the amount of time T4 spent in TZ4 is 130 seconds, and the amount of time T5 spent in TZ5 is 50 seconds.

The first five of eight features are the time spent in each of the first five temperature zones (i.e., TZ1, TZ2, TZ3, TZ4, TZ5) shown in FIGS. 3A and 3B. As an example, if the temperature is within the range of 1652° F. to 1832° F. for 12 seconds, then the value for the time spent in Zone 2 (i.e., TZ2) would be 12 seconds.

Figure 3C:
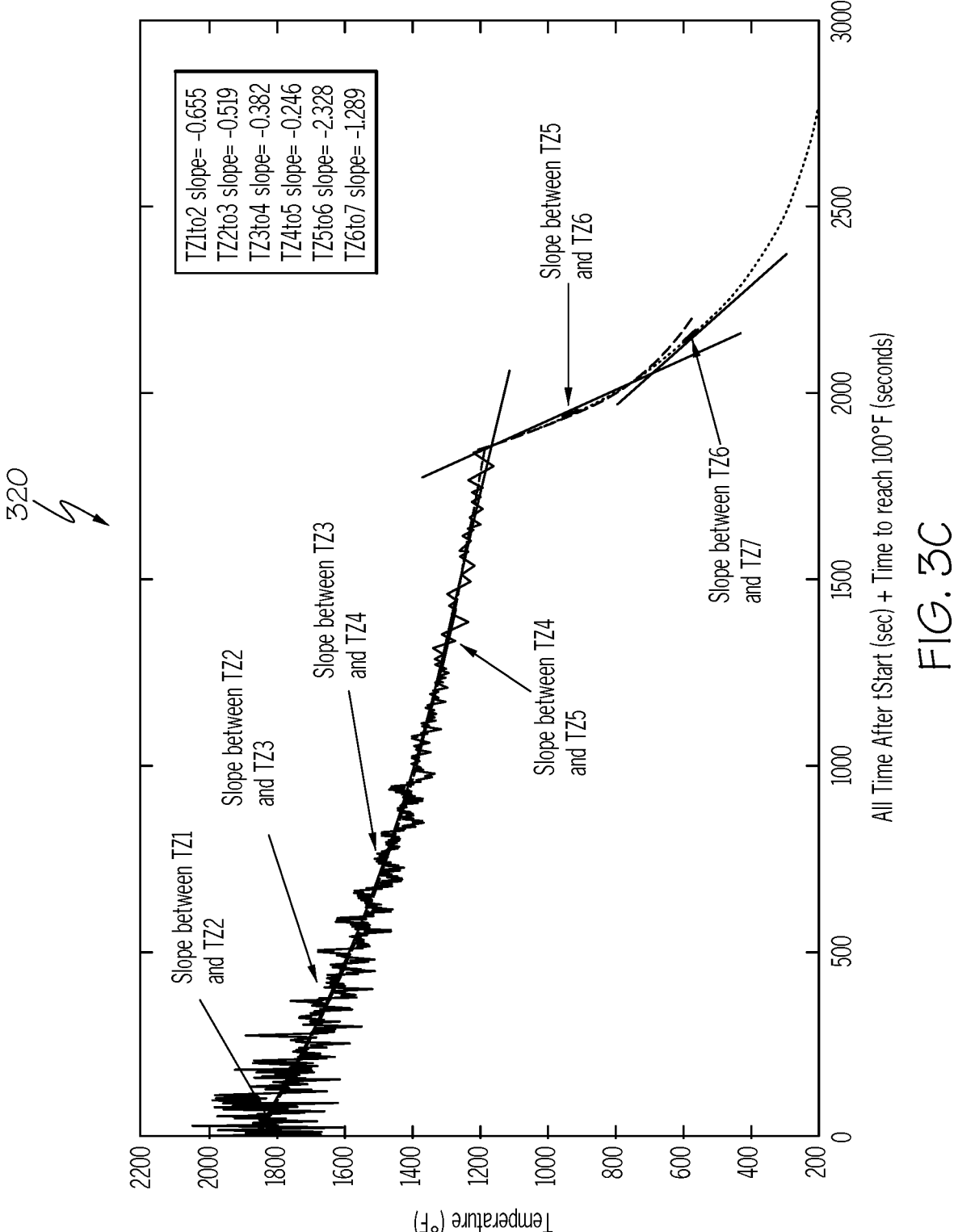
FIG. 3C is a temperature profile diagram showing calculated slope lines between adjacent temperature zones in FIGS. 3A and 3B.

Referring to FIG. 3C, a temperature profile diagram 320 shows calculated slope lines between adjacent temperature zones in FIGS. 3A and 3B. As shown in FIG. 3C, slope between TZ1 and TZ2 is −0.655, slope between TZ2 and TZ3 is −0.519, slope between TZ3 and TZ4 is −0.382, slope between TZ4 and TZ5 is −0.246, slope between TZ5 and TZ6 is −2.328, and slope between TZ6 and TZ7 is −1.289.

It should be apparent that the slope between TZ1 and TZ2 represents the cooling rate between TZ1 and TZ2, the slope between TZ2 and TZ3 represents the cooling rate between TZ2 and TZ3, and the slope between TZ3 and TZ4 represents the cooling rate between TZ3 and TZ4. At the border of each temperature zone (i.e., TZ1 to TZ2, TZ2 to TZ3, etc.), a determination is made of the slope of the smoothed line that starts 20° F. into the higher temperature zone and ends 20° F. into the cooler temperature zone. Each slope line is constructed by connecting the temperature points that are +20° F. and −20° F. from the temperature of each zone boundary (i.e., 1832° F., 1652° F., 1472° F., 1292° F., 932° F., 572° F.).

At some part locations, TZ1 may be zero (i.e., the temperature at the location never reaches as hot as the temperature at the border of TZ1). In this case, the slope between TZ1 and TZ2 is undefined. Despite this, some value needs to be passed to the machine-learning algorithm 170. The solution is to use the arctangent of the slope. By using this arctangent technique, no cooling has a zero slope which is represented by zero degrees, whereas instantaneous cooling has a negative infinite slope which is represented by −90 degrees. Accordingly, the eight input features include the five features which comprise the times the temperature at the specific location spent in the first five temperature zones (i.e., time spent in TZ1, time spent in TZ2, time spent in TZ3, time spent in TZ4, and time spent in TZ5), and the three features which comprise the cooling rate from TZ1 to TZ2, the cooling rate from TZ2 to TZ3, and the cooling rate from TZ3 to TZ4.

Figure 4A:
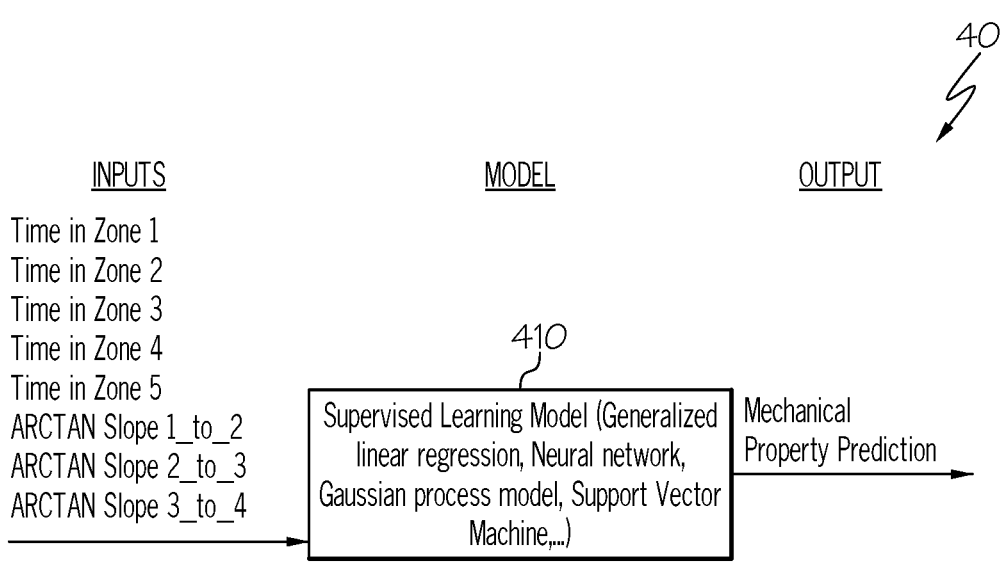
FIG. 4A is a block diagram of an example modeling process using information from FIGS. 2A, 2B, 3A, and 3B to train a machine-learning algorithm that is used in the system of FIG. 1.

Referring to FIG. 4A, a block diagram 400 is illustrated of an example modeling process using information from FIGS. 2A, 2B, 3A, and 3B to train the machine-learning algorithm 170 that is used in the system 100 of FIG. 1. The thermal data that has been collected and processed as described hereinabove is used to train the machine-learning algorithm 170 to predict material properties (e.g., mechanical properties) as a function of its temperature profile as the part is being fabricated.

The machine-learning algorithm 170 comprises a supervised learning model 410 as shown in FIG. 4A. Examples of well-known supervised learning models include a generalized linear regression model, a neural network model, a Gaussian process model, and a support vector machine. For the purpose of explanation, a generalized linear regression, as implemented in JMP Pro, a software package commercially available from JMP Statistical Discovery LLC located in Cary, North Carolina, is used to model the data.

Figure 4B:
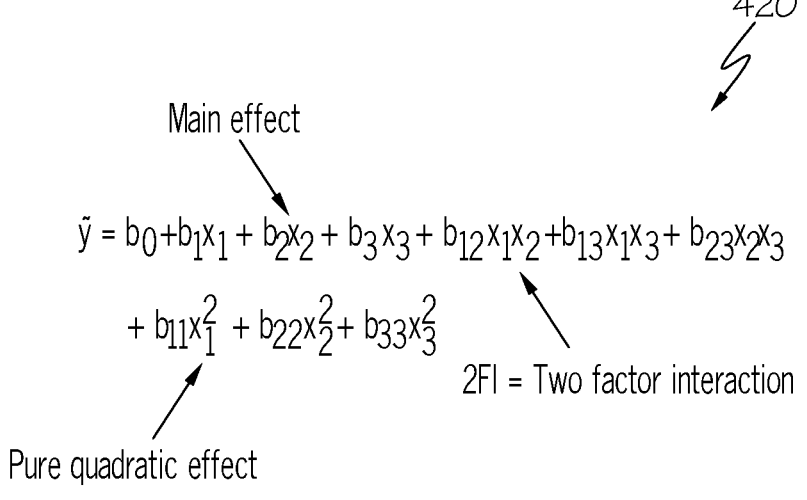
FIG. 4B is a quadratic expression used in the modeling process of FIG. 4A.

Referring to FIG. 4B, a quadratic expression 420 used in the modeling process of FIG. 4A is illustrated. The quadratic expression 420 is used in a modeling process that is configured as a generalized linear regression model. As is known for this type of modeling, the following steps are usually performed to prepare data for modeling.

First, derived terms are added. Regression modeling often uses interaction effects and quadratic effects in addition to main effects. A main effect is the effect of a single independent variable (a.k.a. an input or a factor) on a dependent variable, while ignoring all other independent variables. A statistical interaction (i.e., an interaction effect) occurs when the effect of one independent variable on the dependent variable changes depending on the level of another independent variable. The statistical interaction is captured by multiplying the two factors together. Quadratic effects are then captured by squaring each independent variable. Second, the natural logarithm is taken of some of the main effects. This is done to help linearize the input with respect to the output.

Referring to FIG. 4C, a list 430 is shown of all inputs used to train the machine-learning algorithm 170 that is based upon the generalized linear regression model of FIG. 4B. The first column 'Input Number' shows reference numbers associated with the inputs for easy reference. The second column 'Modeling Inputs' describes in compact form the name and composition of the input. The third column 'Input Type' describes if the input is a main effect, interaction effect, or quadratic effect. The fourth column 'Description,' shows details of how each main effect is calculated.

It is understood that the above-described algorithm and modeling techniques are examples only for the purpose of explanation. Other algorithms and modeling techniques are available for implementation.

Although the above description describes predicting material properties of a part by analyzing two-dimensional (2D) thermal images (i.e., on a pixel-by-pixel basis), it is conceivable that three-dimensional (3D) thermal images (i.e., on a voxel-by-voxel basis) be analyzed to predict material properties of a part. 3D thermal images may be obtained by transforming 2D thermal images into 3D thermal images, as will be described herein.

Figure 5A:
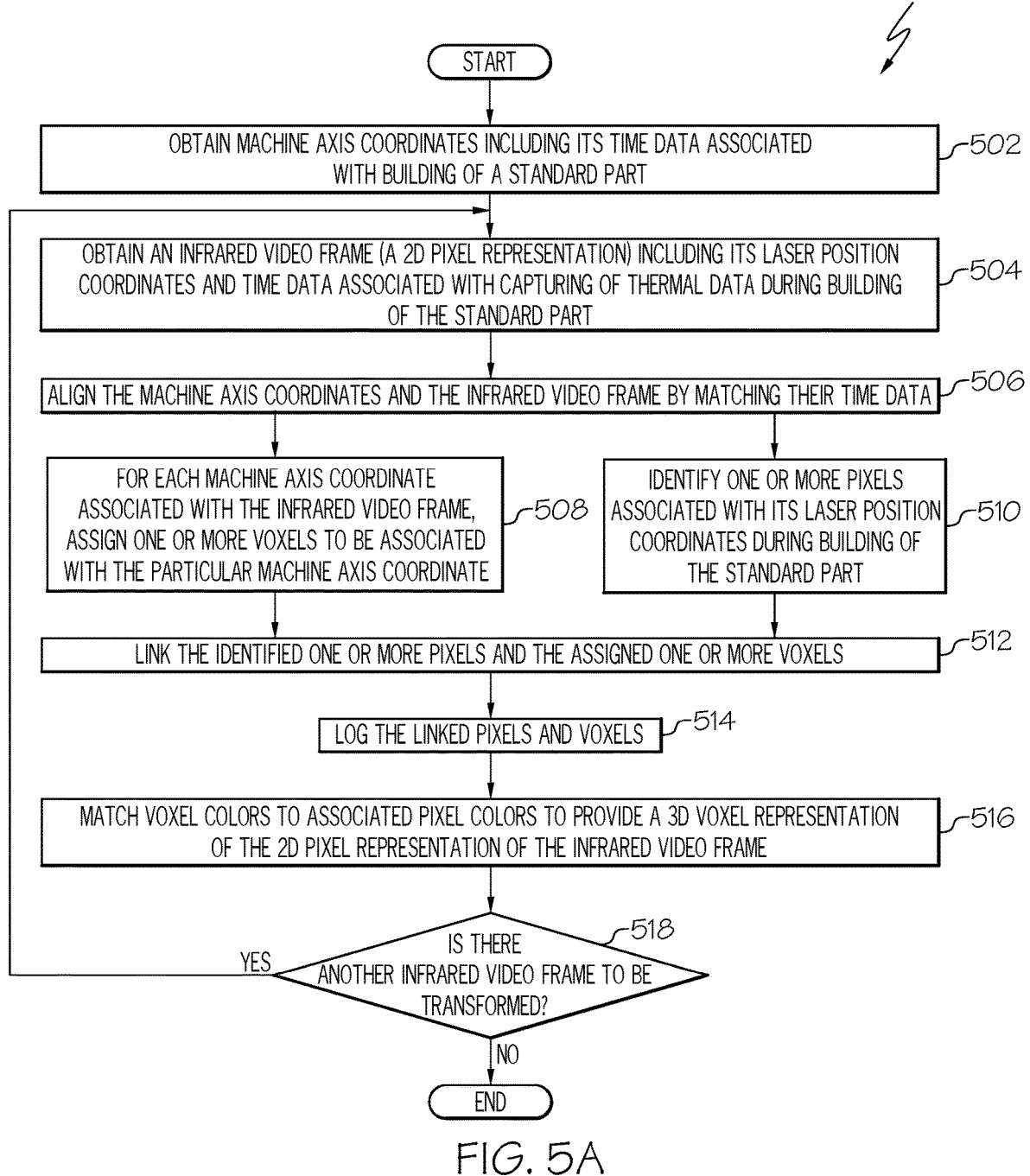
FIG. 5A is a flow diagram of a process for transforming two-dimensional pixels to three-dimensional voxels, according to an embodiment.

Referring to FIG. 5A, a flow diagram 500 is illustrated of a process tor transforming two-dimensional pixels to three-dimensional voxels, according to an embodiment. In block 502, machine axis coordinates including its time data associated with building of a part (e.g., the standard part 104 in FIG. 1) are obtained. The machine axis coordinates may be from a machine, such as a computer numerical control (CNC) machine, which is used to build the standard part. In block 504, an infrared video frame (i.e., a 2D pixel representation) including its laser position coordinates (i.e., from the laser head 140 in FIG. 1) and time data associated with capturing (i.e., collecting) of thermal data during building of the standard part are obtained. The process then proceeds to block 506 in which the time data associated with the machine axis coordinates and the time data associated with the infrared video frame are aligned and matched.

Figure 5B:
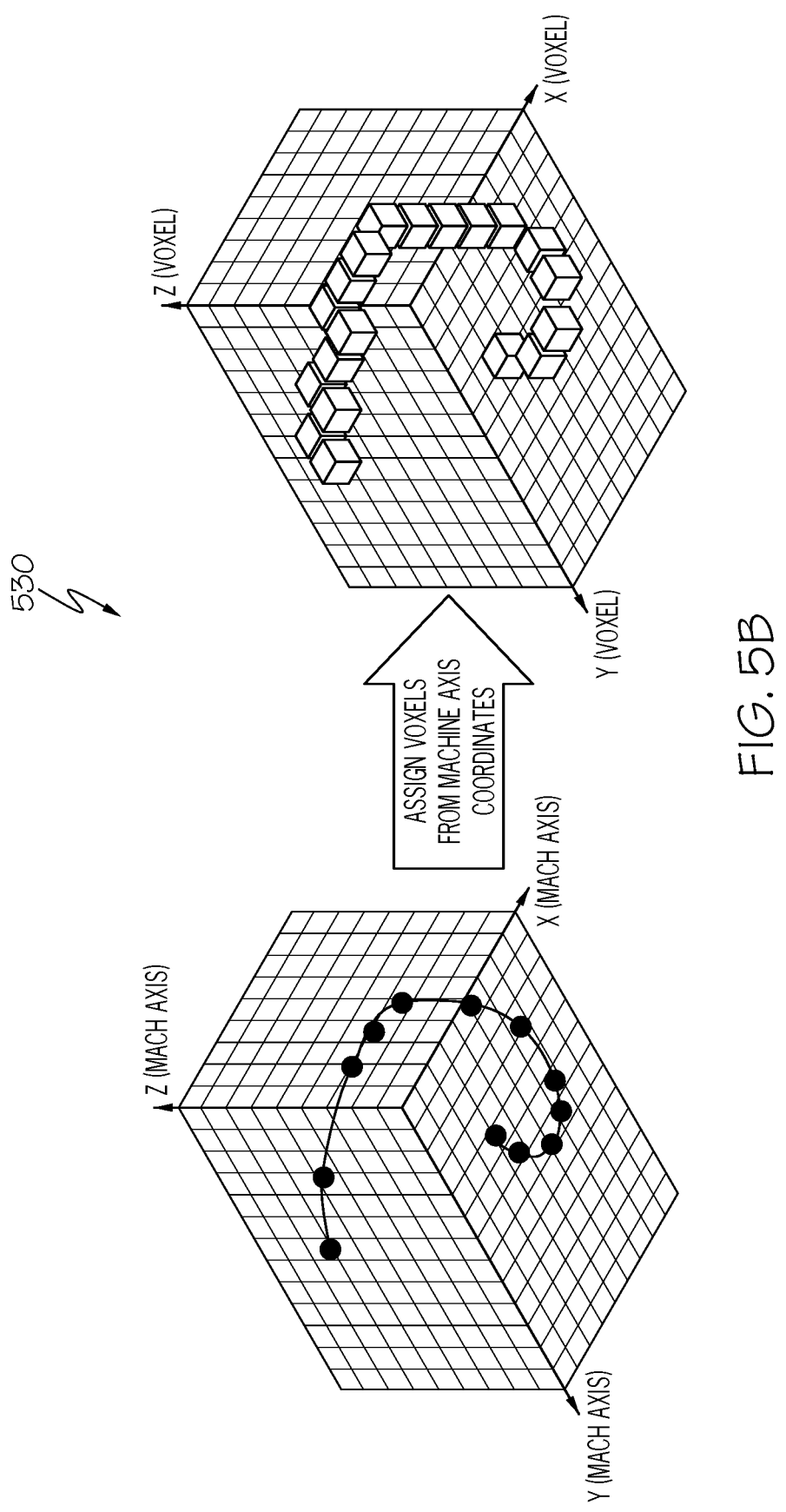
FIG. 5B is a diagram illustrating the relationship between three-dimensional machine axis coordinates and assigned voxels in a three-dimensional grid.

Then in block 508, for each machine axis coordinate associated with the infrared video frame, one or more voxels are assigned to be associated with the particular machine axis coordinate. FIG. 5B is a diagram 530 illustrating the relationship between three-dimensional machine axis coordinates and assigned voxels in a three-dimensional grid. As shown in FIG. 5B, each machine axis coordinate (shown as points) on the left grid is assigned to one or more voxels (shown as cubic volumes) on the right grid.

Figure 5C:
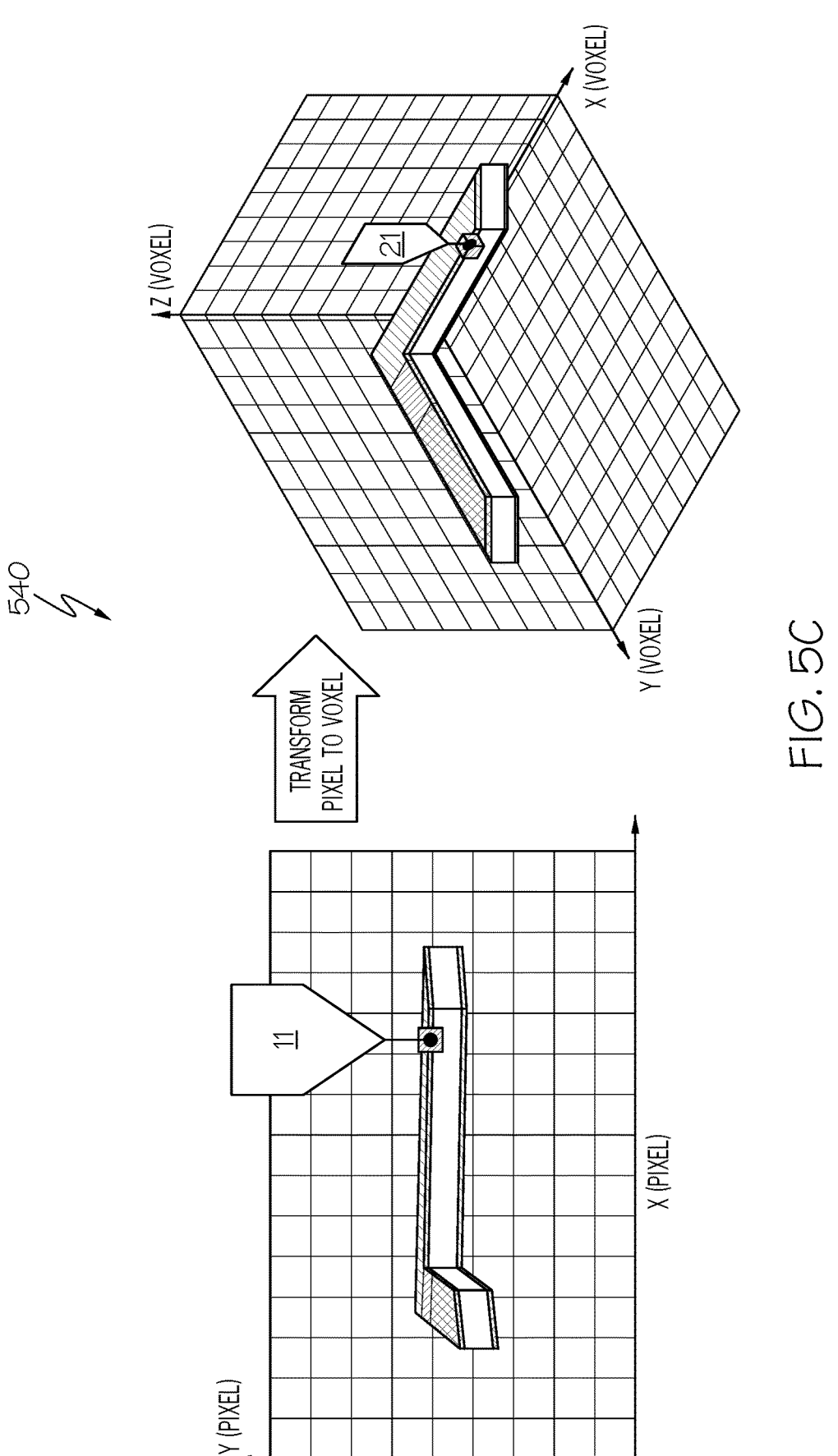
FIG. 5C is a diagram illustrating the relationship between a single pixel of a two-dimensional thermal image and a single voxel of a three-dimensional thermal image that is linked to the two-dimensional thermal image.

Also in block 510 of FIG. 5A, one or more pixels associated with its laser position coordinates during building of the standard part are identified. The process proceeds to block 512 in which the assigned one or more voxels from block 508 and the identified one or more pixels from block 510 are linked. FIG. 5C is a diagram 540 illustrating the relationship between a single pixel 11 of a two-dimensional thermal image on the left grid and a single voxel 21 of a three-dimensional thermal image on the right grid. The single pixel 11 and the single voxel 21 are linked.

The process proceeds to block 514 of FIG. 5A in which the linked pixels and voxels from block 512 are logged and stored (e.g., in the data storage unit 164 shown in FIG. 1). As shown in block 516, the color of each voxel is matched to (i.e., assigned) the color of its associated one or more pixels. The result is a 3D voxel representation of the 2D pixel representation of the infrared video frame obtained back in block 504. The specific color of a pixel is indicative of temperature level at that pixel location as thermal data is being captured during building of the standard part. The thermal data contained in a 2D pixel representation is being reconstructed in a 3D voxel representation.

Figure 5D:
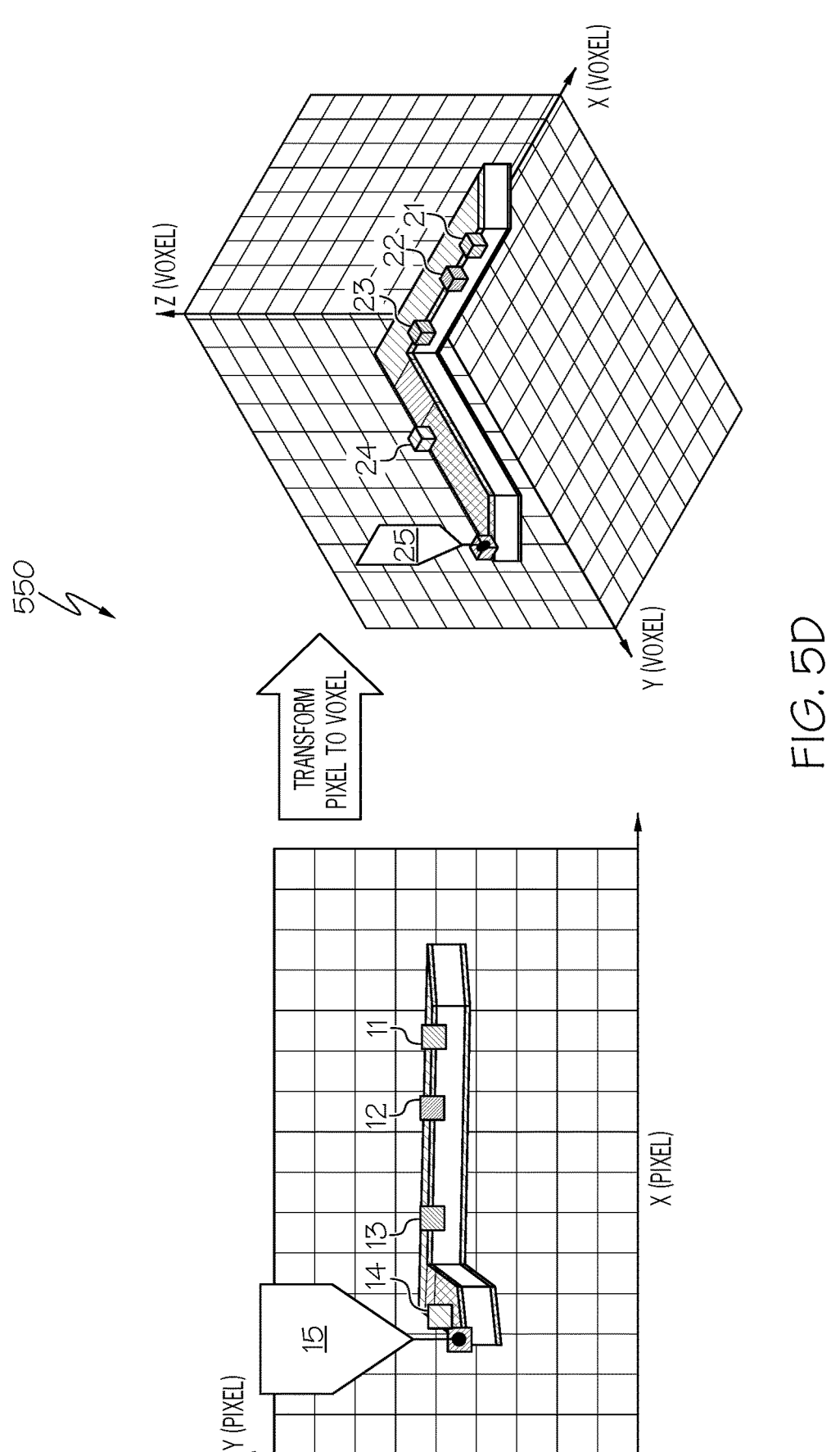
FIG. 5D is a diagram similar to FIG. 5C, and illustrates the relationship between multiple pixels of the two-dimensional thermal image and corresponding multiple voxels of the three-dimensional thermal image.

A determination is then made in block 518 as to whether there is another 2D infrared video frame to be transformed to a 3D voxel representation. If the determination in block is affirmative (i.e., there is another 2D infrared video frame to be transformed), the process returns back to block 504 to repeat the processes of the above-described blocks on the next 2D infrared video frame to be processed. FIG. 5D is a diagram 550 similar to FIG. 5C, and illustrates the relationship between multiple pixels of the two-dimensional thermal image and corresponding multiple voxels of the three-dimensional thermal image. In FIG. 5D, four additional pixels 12, 13, 14, 15 and the pixel 11 in FIG. 5C are shown on the two-dimensional thermal image on the left grid. The four pixels 12, 13, 14, 15 on the 2D left grid are linked to four voxels 22, 23, 24, 25, respectively, on the 3D right grid. However, if the determination in block is negative (i.e., there is no other 2D infrared video frame to be transformed), the process ends.

By transforming 2D thermal images in pixel representation to 3D thermal images in voxel representation, the associated 3D thermal data can be used to train machine-learning algorithms (such as those described hereinabove) to enable prediction of material properties of a physical part yet to be additive-manufactured. This is particularly advantageous when the part to be additive-manufactured has a complex 3D geometry. A part having a complex 3D geometry tends to have complex thermal behavior during additive-manufacturing of the part.

Moreover, it is conceivable that more than one infrared camera can be used to capture more 2D thermal images to provide more 3D thermal images from which a more comprehensive thermal signature and history of an additive-manufactured standard part can be obtained. For example, three infrared cameras may be used to capture 2D thermal images that can be transformed to 3D thermal images in the same way as described hereinabove for one infrared camera.

Figure 6:
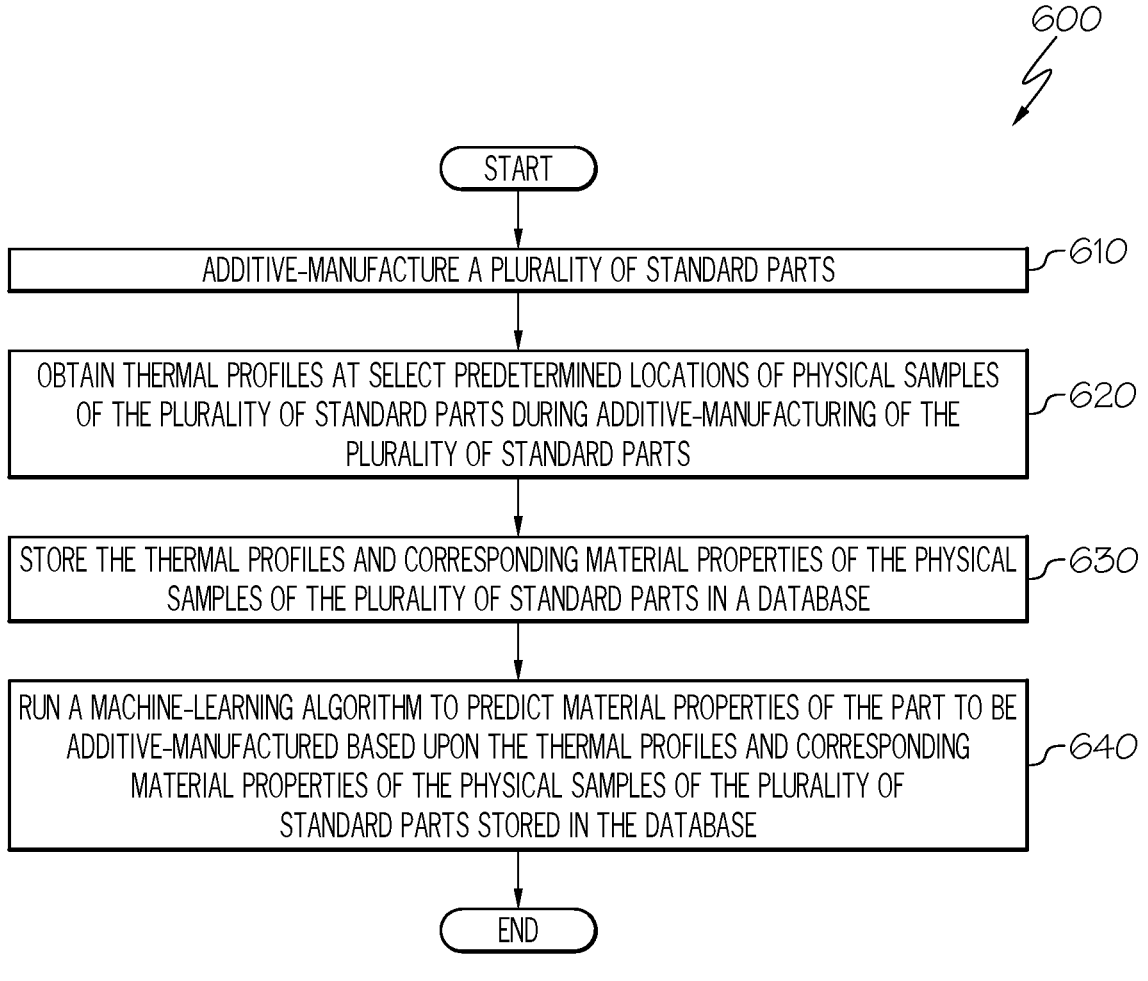
FIG. 6 is a flow diagram of a method for predicting material properties of a part to be additive-manufactured, according to an embodiment.

Referring to FIG. 6, a block diagram 600 is illustrated of a method for predicting material properties of a part to be additive-manufactured, according to an embodiment. In block 610, a plurality of standard parts, which may have various geometrical characteristics, are additive-manufactured. The process proceeds to block 620 in which thermal profiles at select predetermined locations of physical samples of the standard parts are obtained during additive-manufacturing of the standard parts. Then in block 630, the thermal profiles and corresponding material properties of the physical samples of the additive-manufactured standard parts are stored in a database. The process proceeds to block 640 in which a machine-learning algorithm is run to predict material properties of the part to be additive-manufactured based upon the thermal profiles and corresponding material properties of the physical samples of the additive-manufactured standard parts stored in the database. The process then ends.

In some embodiments, the method further comprises determining material properties associated with the thermal profiles of the physical samples of the additive-manufactured standard parts in the database. In some embodiments, a determination is made of a combination of mechanical properties and microstructural properties of the physical samples.

In some embodiments, the method further comprise organizing the combination of mechanical properties and microstructural properties of the physical samples in the database to provide a unique thermal signature and history associated with each physical sample.

In some embodiments, the machine-learning algorithm comprises a supervised learning algorithm. In some embodiments, the supervised learning algorithm comprises a select one of a generalized linear regression model, a neural network model, a Gaussian process model, and a support vector machine model.

In some embodiments, the machine-learning based algorithm has been trained using as inputs a plurality of features contained in a temperature versus time curve associated with a specific location of each physical sample of the plurality of standard parts. In some embodiments, the plurality of features contained in a temperature versus time curve associated with a specific location of each physical sample of the plurality of standard parts includes a combination of one or more times spent in a plurality of temperature zones and one or more cooling rates between temperature zones.

In some embodiments, two-dimensional thermal profiles at the select predetermined locations of physical samples of the standard parts during additive-manufacturing of the plurality of standard parts are obtained, and the two-dimensional thermal profiles are transformed to three-dimensional thermal profiles that correspond to the select predetermined locations of physical samples of the plurality of standard parts during additive-manufacturing of the plurality of standard parts. In some embodiments, one or more pixels associated with each of a plurality of laser position coordinates during additive-manufacturing of the plurality of standard parts are identified, one or more voxels with each of a plurality of machine-axis coordinates are assigned, and the identified one or more pixels and the assigned one or more voxels are linked. In some embodiments, the identified one or more pixels and the assigned one or more voxels are linked based upon alignment of time data associated with the plurality of laser position coordinates and time data associated with the machine-axis coordinates. In some embodiments, color of each voxel is matched to color of its associated one or more pixels.

In some embodiments, at least a portion of the method is performed by a computer having a memory executing one or more programs of instructions which are tangibly embodied in a program storage medium readable by the computer.

In some embodiments, the predetermined locations are based on one or more geometrical characteristics found at such locations.

In some embodiments, an aerospace part is manufactured according to the disclosed method.

A number of advantages are provided by the systems and methods disclosed herein. One advantage is that a quality assessment tool is provided for verifying material quality of an additive-manufactured part based upon unique thermal signatures and histories that have been obtained on a pixel-by-pixel basis (or on a voxel-by-voxel basis) by the infrared camera 132 (FIG. 1). Full history maps of many standard parts are provided. As such, the quality assessment tool is especially advantageous to use when verifying material qualities of a part having complex geometry.

Another advantage is that outputs of optional devices (e.g., the single-wavelength pyrometer 134, the multiple-wavelength pyrometer 136, and the thermocouple sensors 138, all shown in FIG. 1) corroborate the thermal data detected by the infrared camera 132. The result is higher quality thermal data captured by the infrared camera 132.

Yet another advantage is that material properties of a hypothetical part that can be additive-manufactured can be predicted. This allows designers and engineers to simulate thermal histories in place of, or in conjunction with experimental thermal histories to do "virtual design and testing" of a hypothetical part which can be additive-manufactured. This allows the designers and engineers to quickly iterate on part shape designs without having to build and test a designed part. The result is cost savings in the design-build-test cycle of new parts when designed, as well as cost savings in a material quality analysis of existing parts when desired.

Figure 7:
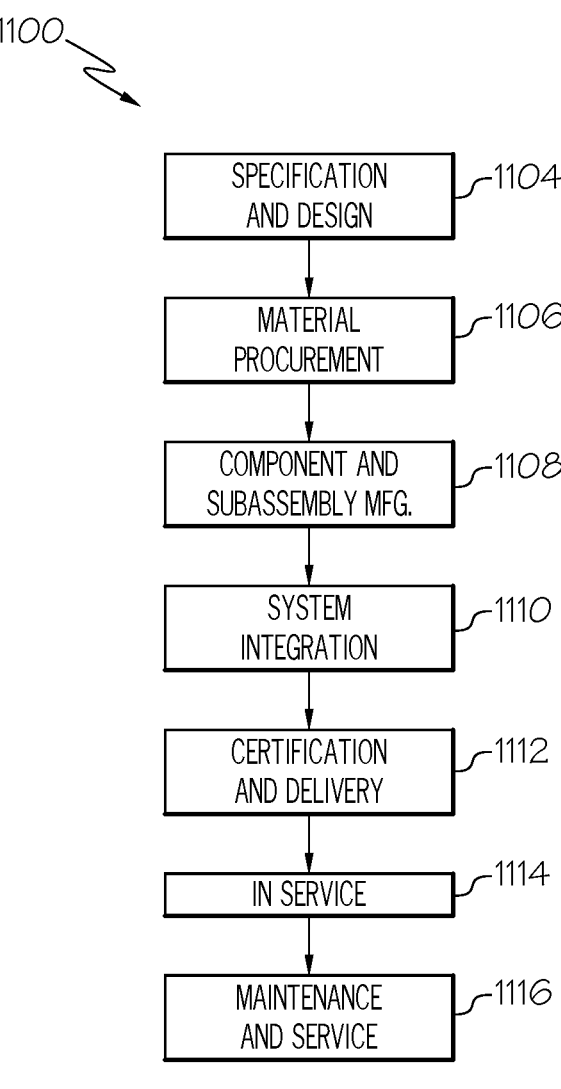
FIG. 7 is a block diagram of aircraft production and service methodology.
Figure 8:
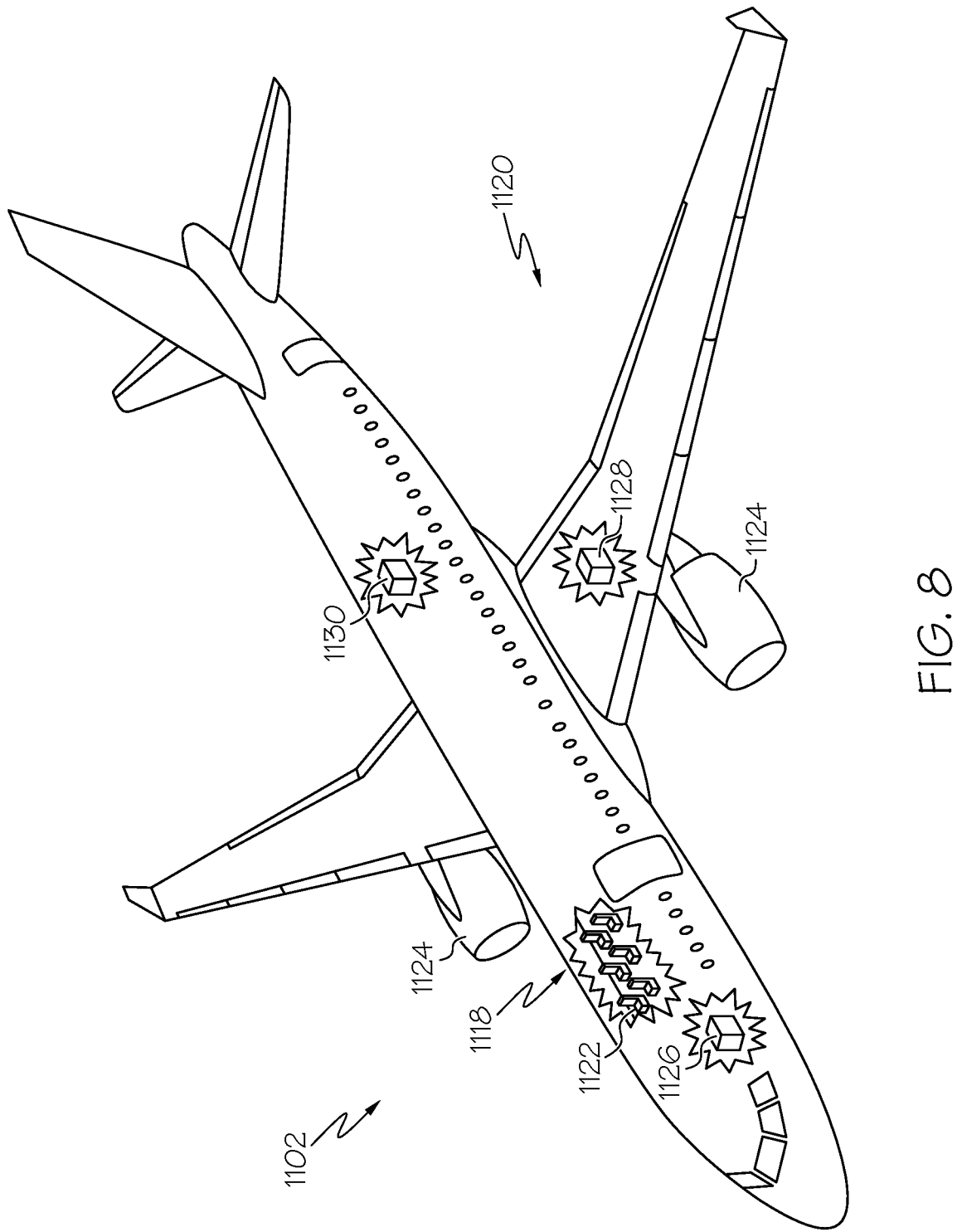
FIG. 8 is a schematic illustration of an aircraft.

Examples of the disclosure may be described in the context of an aircraft manufacturing and service method 1100, as shown in FIG. 7, and an aircraft 1102, as shown in FIG. 8. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment and the like.

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 1102 produced by example method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed system and method may be employed during any one or more of the stages of the aircraft manufacturing and service method 1100. As one example, components or subassemblies corresponding to component/subassembly manufacturing 1108, system integration 1110, and/or maintenance and service 1116 may be assembled using the disclosed system and method. As another example, the airframe 1118 may be constructed using the disclosed system and method. Also, one or more system examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more system examples, method examples, or a combination thereof may be utilized while the aircraft 1102 is in service, for example and without limitation, to maintenance and service 1116.

Different examples of the systems and methods disclosed herein include a variety of components, features, and functionalities. It should be understood that the various examples of the systems and methods disclosed herein may include any of the components, features, and functionalities of any of the other examples of the systems and methods disclosed herein in any combination, and all of such possibilities are intended to be within the scope of the present disclosure.

Program instructions for enabling a controller to perform operation steps may be embedded in memory internal to the controller. Alternatively, or in addition to, program instructions may be stored in memory external to the controller. As an example, program instructions may be stored in memory internal to a different electronic controller unit of the vehicle. Program instructions may be stored on any type of program storage media including, but not limited to, external hard drives, flash drives, and compact discs. Program instructions may be reprogrammed depending upon features of the particular electronic controller unit.

Aspects of disclosed embodiments may be implemented in software, hardware, firmware, or a combination thereof. The various elements, either individually or in combination, may be implemented as a computer program product tangibly embodied in a machine-readable storage device for execution by a computer processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

The above-described system and method are described in the context of an aircraft. However, one of ordinary skill in the art will readily recognize that the disclosed system and method are suitable for a variety of applications, and the present disclosure is not limited to aircraft manufacturing applications. For example, the disclosed system and method may be implemented in various types of vehicles including, for example, helicopters, passenger ships, automobiles, marine products (boat, motors, etc.) and the like. Non-vehicle applications are also contemplated.

Also, although the above-description describes a system and method for predicting material properties of an aerospace part (e.g., an aircraft part) to be additive-manufactured in the aviation industry in accordance with military and space regulations, it is contemplated that the system and method may be implemented to facilitate for predicting material properties of a part to be additive-manufactured in any industry in accordance with the applicable industry standards. The specific system and method can be selected and tailored depending upon the particular application.

Further, although various aspects of disclosed embodiments have been shown and described, modifications may occur to those skilled in the art upon reading the specification. The present application includes such modifications and is limited only by the scope of the claims.

What is claimed is:

1. A method for predicting material properties of a designed part to be additive-manufactured, the method comprising:

additive-manufacturing a plurality of standard parts;

obtaining thermal profiles at select predetermined locations of physical samples of the plurality of standard parts during additive-manufacturing of the plurality of standard parts;

storing the thermal profiles and corresponding material properties of the physical samples of the plurality of standard parts in a database; and running a machine-learning algorithm to process the thermal profiles and the corresponding material properties of the physical samples of the plurality of standard parts and to predict material properties of the designed part without having to build the designed part, wherein the material properties of the designed part are predicted based upon the thermal profiles and the corresponding material properties of the physical samples of the plurality of standard parts stored in the database, wherein the obtaining of the thermal profiles comprises collecting two-dimensional thermal profiles at the select predetermined locations of the physical samples of the plurality of standard parts during the additive-manufacturing of the plurality of standard parts, the method further comprising:

transforming the two-dimensional thermal profiles to three-dimensional thermal profiles that correspond to the select predetermined locations of the physical samples of the plurality of standard parts by identifying one or more pixels associated with each of a plurality of laser position coordinates during the additive-manufacturing of the plurality of standard parts and assigning one or more voxels associated with each of a plurality of machine-axis coordinates.

2. The method of claim 1 further comprising:

determining material properties associated with the thermal profiles of the physical samples of the plurality of standard parts in the database.

3. The method of claim 2 wherein the determining of the material properties associated with the thermal profiles of the physical samples of the plurality of standard parts in the database includes:

determining a combination of mechanical properties and microstructural properties of the physical samples.

4. The method of claim 3 further comprising:

organizing the combination of the mechanical properties and the microstructural properties of the physical samples in the database to provide a unique thermal signature and history associated with each physical sample.

5. The method of claim 1 wherein the machine-learning algorithm comprises a supervised learning algorithm.

6. The method of claim 1 wherein the machine-learning algorithm has been trained using as inputs a plurality of features contained in a temperature versus time curve associated with a specific location of each physical sample of the plurality of standard parts.

7. The method of claim 6 wherein the plurality of features contained in a temperature versus time curve associated with a specific location of each physical sample of the plurality of standard parts includes a combination of one or more times spent in a plurality of temperature zones and one or more cooling rates between temperature zones.

8. The method of claim 1, the transforming of the two-dimensional thermal profiles to three-dimensional thermal profiles comprising:

linking the identified one or more pixels and the assigned one or more voxels.

9. The method of claim 8 wherein the linking of the identified one or more pixels and the assigned one or more voxels includes:

linking the identified one or more pixels and the assigned one or more voxels based upon alignment of time data associated with the plurality of laser position coordinates and time data associated with the plurality of machine-axis coordinates.

10. The method of claim 8 wherein the linking of the identified one or more pixels and the assigned one or more voxels includes:

matching color of each voxel to color of its associated one or more pixels.

11. The method of claim 1 wherein at least a portion of the method is performed by a computer having a memory executing one or more programs of instructions which are tangibly embodied in a program storage medium readable by the computer.

12. The method of claim 1 wherein the predetermined locations are based on one or more geometrical characteristics found at such locations.

13. An aerospace part manufactured according to the method of claim 1.

14. A system for predicting material properties of a designed part to be additive-manufactured, the system comprising:

at least one data collection subsystem that collects thermal data associated with additive-manufactured standard parts during additive manufacturing of the additive-manufactured standard parts; and a controller for processing the thermal data associated with the additive-manufactured standard parts and for predicting material properties of the designed part without having to build the designed part, wherein the material properties of the designed part are predicted based upon the thermal data associated with the additive-manufactured standard parts that was collected by the at least one data collection subsystem, wherein the at least one data collection subsystem collects two-dimensional thermal profiles at select predetermined locations of physical samples of the additive-manufactured standard parts during additive-manufacturing of the additive-manufactured standard parts, and wherein the controller transforms the two-dimensional thermal profiles to three-dimensional thermal profiles that correspond to the select predetermined locations of the physical samples of the additive-manufactured standard parts by identifying one or more pixels associated with each of a plurality of laser position coordinates during additive-manufacturing of the additive-manufactured standard parts and assigning one or more voxels associated with each of a plurality of machine-axis coordinates.

15. The system of claim 14 wherein the at least one data collection subsystem includes a combination of an infrared camera, a single-wavelength pyrometer, a multiple-wavelength pyrometer, a baseplate having one or more thermocouple sensors, and a laser head.

16. The system of claim 14 wherein the controller comprises a processor of a computer.

17. The system of claim 14 wherein the controller for predicting material properties of the designed part that can be additive-manufactured part predicts a combination of material properties and microstructural properties associated with the designed part.

18. The system of claim 17 wherein the combination of the material properties and the microstructural properties associated with the designed part includes a combination of yield strength, tensile strength, and elongation strength.

19. The system of claim 14 wherein the controller includes a machine-learning algorithm that has been trained using as inputs a plurality of features contained in a temperature versus time curve associated with a specific location of each additive-manufactured standard part.

20. The system of claim 19 wherein the machine-learning algorithm comprises a supervised learning algorithm.

21. The system of claim 14 wherein the thermal data associated with each additive-manufactured part that was collected by the at least one data collection subsystem comprises a unique thermal signature and history associated with that particular additive-manufactured part.

22. The system of claim 14 wherein the at least one data collection subsystem comprises one or more infrared cameras for collecting the thermal data associated with additive-manufactured standard parts.

23. The system of claim 22 wherein the thermal data associated with each additive-manufactured standard part that was collected by the at least one data collection subsystem comprises three-dimensional thermal data that is transformed from two-dimensional thermal data.

24. The system of claim 14 wherein the at least one data collection subsystem collects thermal profiles at select predetermined locations of physical samples of a plurality of standard parts during additive-manufacturing of the plurality of standard parts, and wherein the predetermined locations are based on one or more geometrical characteristics found at such locations.

25. An aerospace part manufactured using the system of claim 14.

26. The system of claim 14 wherein the controller is configured to link the identified one or more pixels and the assigned one or more voxels.

27. The system of claim 26 wherein the controller is configured to link the one or more pixels to the one or more voxels based on alignment of time data associated with the plurality of laser position coordinates and time data associated with the plurality of machine-axis coordinates.

28. A system for predicting material properties of a designed part to be additive-manufactured, the system comprising:

one or more infrared cameras for collecting thermal data associated with additive-manufactured standard parts, wherein the thermal data associated with each additive-manufactured part that was collected by the one or more infrared cameras comprises a unique thermal signature and history associated with that particular additive-manufactured part; and a computer processor for processing the thermal data associated with the additive-manufactured standard parts and for predicting a combination of material properties and microstructural properties associated with the designed part without having to build the designed part, wherein the material properties of the designed part are predicted based upon the thermal data associated with the additive-manufactured standard parts that was collected by the one or more infrared cameras, wherein the one or more infrared cameras collect two-dimensional thermal profiles at select predetermined locations of physical samples of the additive-manufactured standard parts during additive-manufacturing of the additive-manufactured standard parts, and wherein the computer processor transforms the two-dimensional thermal profiles to three-dimensional thermal profiles that correspond to the select predetermined locations of the physical samples of the additive-manufactured standard parts by identifying one or more pixels associated with each of a plurality of laser position coordinates during the additive-manufacturing of the additive-manufactured standard parts and assigning one or more voxels associated with each of a plurality of machine-axis coordinates.

29. The system of claim 28 wherein the thermal data associated with each additive-manufactured standard part that was collected by the one or more infrared cameras comprises two-dimensional thermal data and three-dimensional thermal data that is transformed from the two-dimensional thermal data.

30. The system of claim 28 wherein the computer processor is configured to link the identified one or more pixels and the assigned one or more voxels.

*     *     *     *     *